United States Patent [19]
Watanabe et al.

[11] Patent Number: 5,648,692
[45] Date of Patent: Jul. 15, 1997

[54] STATOR YOKE AND METHOD OF PRODUCING SAME

[75] Inventors: Kazuyuki Watanabe, Hamamatsu; Hirofumi Nakano, Toyohashi; Masakuni Kamiya; Kazutaka Honma, both of Hamamatsu; Takayuki Matsui; Akito Suzuki, both of Kosai, all of Japan

[73] Assignee: FDK Corporation, Tokyo, Japan

[21] Appl. No.: 492,885

[22] Filed: Jun. 20, 1995

[30] Foreign Application Priority Data

Jun. 24, 1994 [JP] Japan ................... 6-164818

[51] Int. Cl.$^6$ ...................... H02K 37/14; H02K 1/02
[52] U.S. Cl. ........................... 310/49 R; 310/43
[58] Field of Search .................. 310/49 R, 42; 29/596

[56] References Cited

U.S. PATENT DOCUMENTS

| | | | |
|---|---|---|---|
| 4,410,769 | 10/1983 | Tibbetts | 310/25 |
| 4,990,806 | 2/1991 | Kikuchi et al. | 310/49 A |
| 5,331,237 | 7/1994 | Ichimura | 310/44 |

FOREIGN PATENT DOCUMENTS

| | | |
|---|---|---|
| 62-135577 | 8/1987 | Japan . |
| 63-026337 | 2/1988 | Japan . |
| 3-104077 | 10/1991 | Japan . |
| 3-283049 | 12/1991 | Japan . |

*Primary Examiner*—Steven L. Stephan
*Assistant Examiner*—Judson H. Jones
*Attorney, Agent, or Firm*—Keck, Mahin & Cate

[57] ABSTRACT

There is provided a stator yoke capable of improving magnetic characteristics and a rust-proofing effect of a stator yoke produced by using a Fe-Cr type alloy. When a stator yoke is produced by using a Fe-Cr type alloy, its magnetic characteristics can be improved, but when press working is made to obtain a predetermined shape, the magnetic characteristics drop. Annealing is carried out so as to recover the magnetic characteristics. This annealing generates the property change of a surface layer and a rust-proofing effect lowers.

12 Claims, 7 Drawing Sheets

STATOR YOKE AND METHOD OF PRODUCING SAME

BACKGROUND OF THE INVENTION

This invention relates to a Stator yoke and a method of producing the stator yoke for stepping motors, for example.

Stator yokes and frame yokes of conventional stepping motors are produced by using an electromagnetic soft magnetic iron plate (SUY), a cold rolled low carbon steel sheet (SPC), electrolytic zinc-coated steel sheet (SEC), and so forth. However, although these materials have excellent D.C. magnetic field characteristics, it has been found out that their A.C. magnetic field characteristics are inferior during the practical operation of the motors. In other words, because these steel materials have low electric resistivity, a great deal of eddy currents occur, so that an eddy current loss remarkably increases. This tendency becomes more remarkable as a driving frequency is higher. Accordingly, efficiency drops and this constitutes a bottle neck in satisfying the requirement for the improvement of efficiency of the stepping motors in connection with a battery-driven OA equipment.

To solve such problems, various proposals have been made. For example, a silicon steel sheet or soft ferrite is used for the stator yoke and the frame yoke (Japanese Utility Model Laid-Open Nos. 3-104077/1991, 62-135577/1987, etc.), and a through-hole is formed in a part of the stator yoke (a flow path of the eddy current) (Japanese Patent Laid-open No. 3-283049/1991, etc.).

However, the conventional stepping motors described above involve the following respective problems and cannot sufficiently solve the problem of the drop of efficiency due to the eddy current.

First, in the case of the silicon steel sheet, bending is more difficult than with SUY and SPC used for the stator yoke material, and plating treatment for rust-proofing is difficult. It might be possible to reduce the amount of addition of Si so as to improve machinability but in this case, electric resistivity drops, too, so that the effect of the reduction of the eddy current disappears.

When the soft ferrite is used, a saturation flux density is as low as ⅓ that of SUY and SPC. Therefore, in addition to the problem that a sufficient output torque cannot be obtained, there occur various other problems that bending is difficult, mechanical strength is low and moreover, dimensional precision drops below a practical level.

According to the construction wherein the through-hole is bored, the output torque tends to decrease with the formation of the through-holes. Furthermore, the number of machining steps increases and the production cost becomes higher. The through-holes are formed at portions other than comb tooth-like magnetic pole portions other than the comb tooth-like pole portions. In other words, the effect brought forth by the formation of the through-hole is not great because the loss due to the eddy current is originally not so great at such portions.

Accordingly, the inventors of the present invention previously developed a stepping motor capable of solving these problems, reducing the occurrence of the eddy current to minimum and obtaining high efficiency, and filed a patent for this stepping motor in our Patent Application No. 5-3099698/1993, filed Nov. 17, 1993. In this Japanese application a part, or the whole, of at least the stator yokes constituting the stepping motor is made of a ferrite type Fe-Cr type alloy that has never been used for the stator yoke in the past. (A specific construction will be later described.) The invention disclosed in the Japanese application constitutes an embodiment of the present invention.

When the stator yoke is produced using the new material which has not been used in the past and the stepping motor is assembled and produced using such stator yokes, the effects of restriction of the eddy current, etc., could be observed, but subsequent studies have revealed other problems. Namely, when the stator yoke is produced, a flat sheet material having a predetermined shape is press worked, but this press working invites deterioration of magnetic characteristics and the remarkable effect brought forth by the use of the Fe-Cr type alloy cannot be exhibited sufficiently though performance of the motor can be improved as a whole because the effect of restriction of the occurrence of the eddy current is relatively greater. Therefore, as well as development of the new material for the stator yoke, that is, the ferrite type Fe-Cr type alloy, the development of the production method suitable for producing the stator yoke by using the Fe-Cr type alloy has become necessary at the same time.

SUMMARY OF THE INVENTION

In views of the background and circumstances described above, the present invention aims at providing a new stator yoke of a ferrite type Fe-Cr type alloy, and a production method of a stator yoke which solves the problems described above and which improves the characteristics of a stepping motor equipped with the stator yokes produced by using the Fe-Cr type alloy.

More specifically, the present invention is directed to provide a stator yoke, which is partly or entirely made of a ferrite type Fe-Cr type alloy, having a predetermined shape and capable of increasing treatment effect when each treatment is carried out. Further, the present invention is also directed to provide a method of producing a stator yoke having high magnetic characteristics (A.C. magnetic characteristics), a high rust-proofing effect and a high corrosion resistance.

According to the present invention, there is provided a stator yoke for a stepping motor wherein stepping motor has a rotor portion having a multi-polarized permanent magnet, a stator yoke portion having a plurality of comb tooth-like pole portion, an excited coil means provided around said comb tooth-like pole portion of said stator yoke portion, and a frame yoke encasing therein said stator yoke portion and said excited comb means, wherein at least a part of the stator yoke is made of a ferrite type Fe-Cr type alloy.

In a preferred embodiment of the invention, the ferrite type Fe-Cr alloy contains 10 to 20 wt % of Cr and 80 to 90 wt % of Fe.

In another aspect of the present invention, there is provided a method of producing a stator yoke for a stepping motor. The production method of a stator yoke according to the present invention first presses a sheet material having a predetermined shape and made of a ferrite type Fe-Cr type alloy and bends at least the inner peripheral edge of a flat ring-like flange portion in a predetermined direction so as to form a plurality of comb tooth-like pole portions. Then, the present method conducts annealing. Preferably, this annealing temperature is determined in the range of 700° to 1,100° C.

Preferably, nickel plating is applied to the surface of the sheet material made of the Fe-Cr type alloy described above before, or after, press working, and annealing described above is conducted at a predetermined process step after nickel plating.

In an embodiment of the invention, a sheet material having a predetermined shape and made of the ferrite type Fe-Cr type alloy is press worked and at least the inner peripheral edge of the flat ring-like flange portion is bent in a predetermined direction so as to form a plurality of comb tooth-like pole portions. Then, annealing is carried out. Thereafter, a chemical polishing treatment is conducted to execute surface treatment of the stator yoke. Further preferably, after, or during this chemical polishing treatment, ultrasonic cleaning is carried out. Further, after this ultrasonic cleaning is conducted, a passivation treatment is carried out by immersing the stator yoke in a predetermined acid.

When press working described above is carried out, it is further preferred to conduct this working using a non-chlorine type press oil.

The stator yoke according to the present invention is based on the premise that a stator yoke is made of the ferrite type Fe-Cr type alloy as the material and as the basic shape of the stator yoke, it includes at least the flat ring-like flange portion and a plurality of comb tooth-like pole portions formed by bending the inner peripheral edge of the flange portion In a predetermined direction. Further, a protuberance having a tapered distal end is formed at a predetermined position of the surface of the flange portion. Preferably, the height of this protuberance is not greater than 1.0 mm.

Under the same condition of the premise described above, another means for solving the problems employs the construction wherein a protuberance protruding towards the center is formed at portions of the inner peripheral surface of the flange portion at which the comb tooth-like pole portions are not formed.

The magnetic characteristics (particularly, the A.C. magnetic characteristics which are important in the environment of practical use) can be improved when the stator yoke is produced by using the Fe-Cr type alloy. However, when the sheet material is press worked to obtain a predetermined shape, the magnetic characteristics drop due to the residual stress applied during working, and the effect brought forth by using the Fe-Cr type alloy cannot be exhibited sufficiently. Needless to say, however, the characteristics can be sufficiently improved in comparison with the stator yokes made of conventional SPC.

Therefore, annealing is carried out after press working. Then, deterioration of the magnetic characteristics resulting from press working can be recovered, and the magnetic characteristics become higher. This annealing temperature is preferably within the range of 700° to 1,100° C. For, this range is a 95% range of the greatest magnetic characteristics, and when the temperature becomes lower, the effect of annealing cannot be obtained sufficiently and when the temperature becomes higher, on the other hand, martensite precipitates and deteriorates the magnetic characteristics, though the residual stress can be removed.

The properties of the surface layer will change due to the annealing described above and the rust-proofing effect drops. Therefore, the chemical polishing treatment is carried out and the surface layer the properties of which change can be removed. Furthermore, when the ultrasonic cleaning treatment is applied, the physical force is applied to the surface layer having the changed properties in addition to the chemical force, so that the surface layer having the changed properties can be removed completely within a short time. Thereafter, when the stator yoke is left standing in air, the passivation film is formed on the surface of the Fe-Cr type alloy due to oxidation, and the rust-proofing force as well as the corrosion resistance can be improved. A more remarkable effect can be obtained when ultrasonic cleaning is conducted while the chemical polishing treatment is being made.

When the passivation treatment is carried out after ultrasonic cleaning described above, the passivation film is compulsively formed within a short time on the surface of the Fe-Cr type alloy. Accordingly, the stator yoke does not thereafter gather rust and the corrosion resistance becomes higher.

It is also possible to apply nickel plating to the surface of the Fe-Cr type alloy before annealing separately from the series of treatments described above. In such a case, because nickel plating is thermally stable at the annealing temperature, the change of the surface composition does not occur. Accordingly, the surface of the stator yoke brought into contact with air under the environment of practical use exhibits the rust-proofing effect due to the existence of nickel plating.

On the other hand, when the non-chlorine type press oil is used when press working is carried out in the inventions described above, rust does not occur on the stator yoke during storing after press working. Even when the press oil remains after cleaning of the press oil, rust does not occur because the press oil is of the non-chlorine type.

On the other hand, if the treating solutions used for cleaning the press oil described above, chemical surface of the stator yoke, the treating result (effect) of each treatment cannot be fully expected. Therefore, the protuberance is disposed on the surface of the flange portion or on the inner peripheral surface. When large quantities of the stator yokes are simultaneously processed, a plurality of stator yokes are likely to overlap with one another but the flange portion of one of the stator yokes strikes the protuberance of the other, or the distal end of the comb tooth-like magnetic pole portion of one of the stator yokes strikes the protuberance of the other. Accordingly, the stator yokes do not approach beyond the limit, that is, they do not overlap with one another. For this reason, the predetermined treating solutions spread over the entire surface and more reliable treating effects can be obtained.

When the height of the protuberance is not greater than 1.0 mm, the sheet thickness of the coil bobbin at the time of the motor assembly need not be changed. In other words, if the height exceeds 1.0 mm, the protuberance is likely to protrude beyond the flange of the coil bobbin and to come into contact with the coil, and the sheet thickness of the coil bobbin must be increased. Then, not only a new mold becomes necessary, but the height of the motor becomes great, so that the size of the motor becomes great. Alternatively, the coil volume must be decreased and the motor characteristics drop. The construction of the present invention is free from such problems.

BRIEF DESCRIPTION OF THE DRAWING

FIG. 16 is an enlarged view of principal portions.

PREFERRED EMBODIMENTS OF THE INVENTION

Hereinafter, a stator yoke and a production method of the stator yoke according to preferred embodiments of the present invention will be explained in detail with reference to the accompanying drawings.

Figure 1:
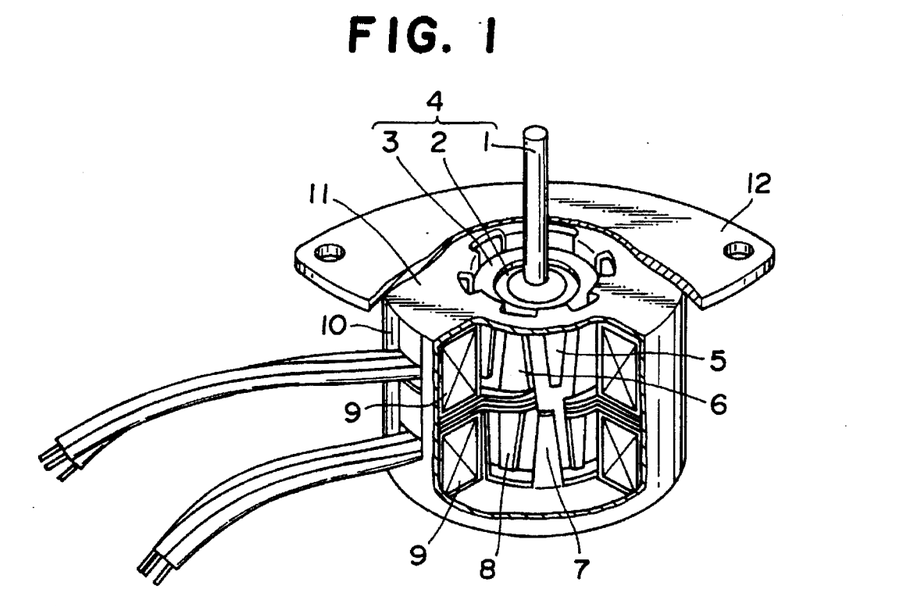
FIG. 1 shows an example of a stepping motor.
Figure 2:
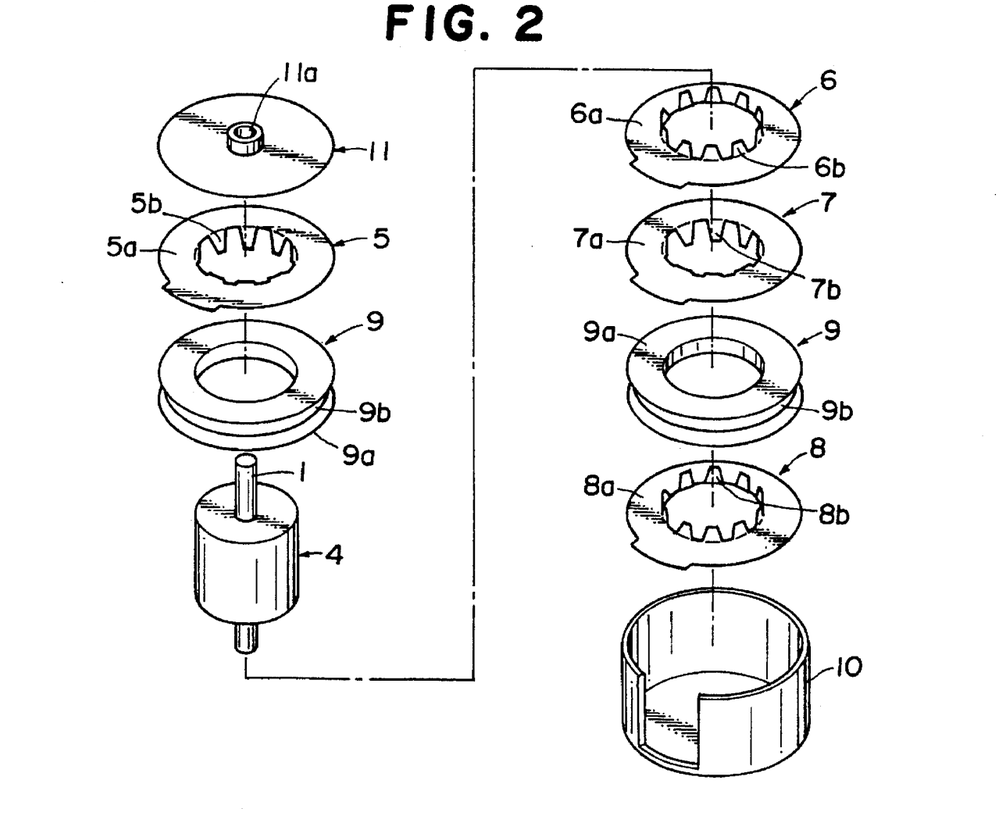
FIG. 2 is an exploded perspective view of the stepping motor.

First, the stepping motor according to the present invention will be explained. As shown in FIGS. 1 and 2, a rotor 4 is formed by integrally fixing a cylindrical permanent magnet 3 around a shaft 1 through a connecting member 2. The outer periphery of this permanent magnet 3 is divided in a large number of segments in a circumferential direction and magnetized.

Since this embodiment deals with a two-phase type stepping motor, first to fourth stator yokes 5 to 8 are concentrically disposed round the rotor 4. More specifically, the first and second stator yokes 5 and 6 constitute the first phase and the third and fourth stator yokes 7 and 8 constitute the second phase. Each of the stator yokes 5 to 8 has comb tooth-like magnetic pole portions 5b to 8b that are formed by bending by 90° the inner periphery of a ring-like flange portion 5a to 8a of a flat sheet in a predetermined direction. The pairs of stator yokes (that is, 5 and 6, and 7 and 8) are arranged in such a manner that the distal ends of the comb tooth-like portions 5b and 6b and 7b and 8b oppose one another and are fitted into tooth non-formation portions (non-toothed portions) of the comb tooth-like magnetic pole portions, respectively. The electric angle of the first phase side is deviated by 90° from that of the second phase side.

An excitation coil 9 produced by winding a coil portion 9b to a coil bobbin 9a is fitted to the outer periphery of the stator yoke pair (5 and 6, and 7 and 8). In this way, the excitation coil 9 is sandwiched between the flange portions (5a and 6a, and 7a and 8a).

A cup-like frame yoke 10 having a bottom is concentrically fitted to the outer periphery of the rotor 4, the stator yokes 5 to 8 and the excitation coil 9 in such a manner as to encompass them. In other words, each of these components is fitted and disposed in the frame yoke 10. The open end side of the frame yoke 10 is covered by a cap 11 under this state. The shaft 1 penetrates through a through-hole 11a formed n the cap 11 and protrudes outside, and functions as an output shaft. Further, a flange 12 for fixing the stepping motor to a predetermined position of other device is integrally formed on the outside surface of the cap 11 (see FIG. 1). The shape and construction of each of the components described above are fundamentally the same as those of the prior art apparatuses.

All of the four stator yokes 5 to 8 described above are made of an Fe-Cr type alloy (ferrite type). This ferrite type Fe-Cr alloy preferably contains 10 to 20 wt % of Cr and 80 to 90 wt % of Fe. Preferred examples of such alloys are JIS SUS430, SUS 410L, and so forth. On the other hand, an Fe type alloy is used for the frame yoke 10 in the same way as In the prior art.

According to the construction described above, the eddy current that might occur in the stator yokes 5 to 8 with an A.C. magnetic field during driving of the motor can be reduced to minimum, and efficiency can be improved. In other words, to obtain the same output torque, the present invention can reduce the size of the stepping motor to the extend corresponding to the improvement of efficiency. Since bending workability does not at all change in comparison with the stator yokes formed by using the conventional Fe alloy, the stator yoke of the invention can be produced by using the same press mold.

When the Cr content is 10 to 15 wt %, rust-proofness required in an ordinary room temperature environment can be obtained while magnetic characteristics are kept within an extremely excellent range. In this case, the present apparatus is mainly suitable for indoor use (office automation appliances, etc.). When the Cr content is 15 to 20 wt %, on the other hand, rust-proofness can be further improved. Therefore, the present apparatus is suitable for outdoor use (for vehicle-mounted and outdoor equipments) or for export (because It is not affected by brine when transported by ships). In this case, too, sufficiently higher magnetic characteristics than the prior art apparatuses can be obtained, through the magnetic characteristics become lower than those of the former.

The production method of a stator yoke according to the present invention is directed to produce the four stator yokes 5 to 8 made of the Fe-Cr type alloy described above. In the first embodiment of the invention, the production method is as follows.

As described above, the inner periphery of the ring-like flange portion 5a to 8a of the flat sheet of the Fe-Cr type alloy such as the one shown in FIGS. 1 and 2 is bent by 90° in a predetermined direction by press machining so as to form the comb tooth-like magnetic pole portion 5b to 8b. Then, the magnetic characteristics are somewhat deteriorated due to the residual stress applied at the time of working.

Therefore, annealing is carried out after press working in a predetermined atmosphere and at a predetermined temperature in the method of the present invention. More specifically, annealing is preferably carried out In an inert gas atmosphere of argon or nitrogen or in vacuum. As a result of experiments, it has been found out that annealing is preferably carried out at 700° to 1,100° C.

To evidence the effects of the present invention (the improvements of the characteristics due to annealing), various characteristics were examined by using the following testpieces:

1) the stator of a motor of the embodiment described above (two-phase bipolar constant current chopper driving), that is, the motor using the stator yokes produced by press-working the Fe-Cr type alloy and then conducting annealing (Embodiment 1 of the present invention);
2) the motor using stator yokes produced by press-working the same Fe-Cr type alloy without annealing; Embodiment 2 of the present invention; and
3) the conventional motor using stator yokes produced by press-working SPC and having the same shape (the difference being the difference of the material of the stator yokes; Comparative Example).

Incidentally, the Fe-Cr type alloy in the motor of Embodiment 1 of the present invention and in Comparative Example 1 comprised 12 wt % of Cr and 86 wt % of Fe (with the balance being trace additives) in this experiment. Annealing was carried out for Embodiment 1 in the nitrogen atmosphere at 850° (for not more than one hour).

Figure 3:
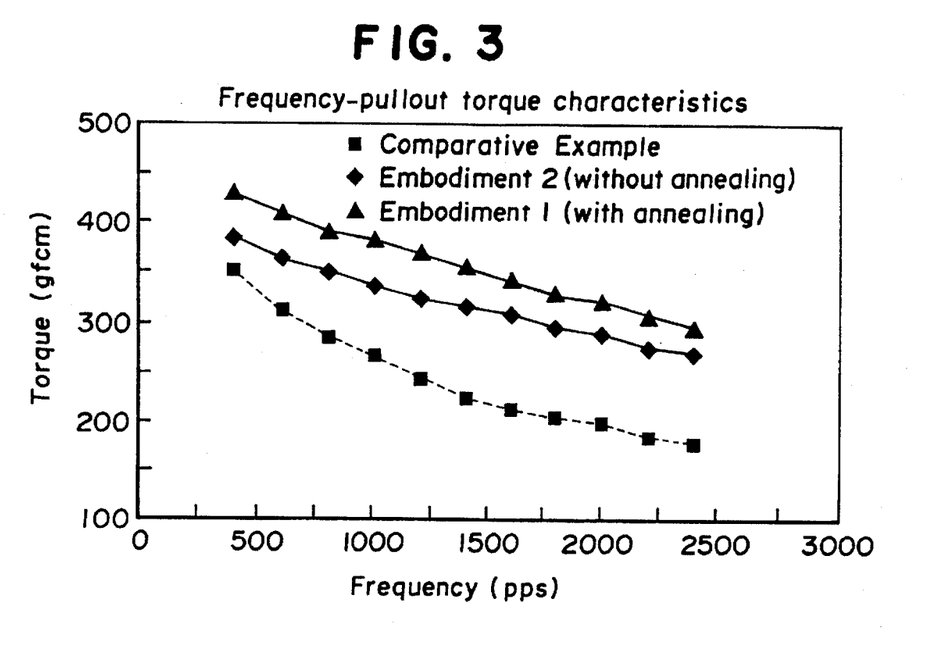
FIG. 3 is a characteristic diagram evidencing the effect of the first embodiment of the present invention.
Figure 4:
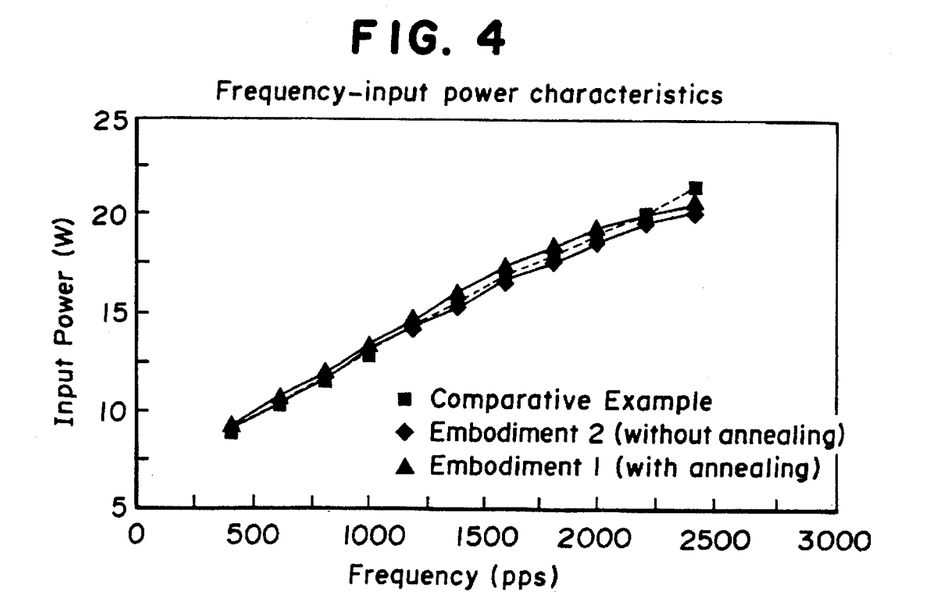
FIG. 4 is a characteristic diagram showing the effect of the first embodiment of the present invention.

As a result of the investigation of the pullout torque characteristics with respect to the frequency at the time of constant current driving, it has been found out that when the input power remained the same (see FIG. 4) as shown in FIG. 3, the motor of Embodiments 1 and 2 the present invention provided a higher torque than Comparative Example of the prior art apparatus and the characteristics could be improved.

Figure 5:
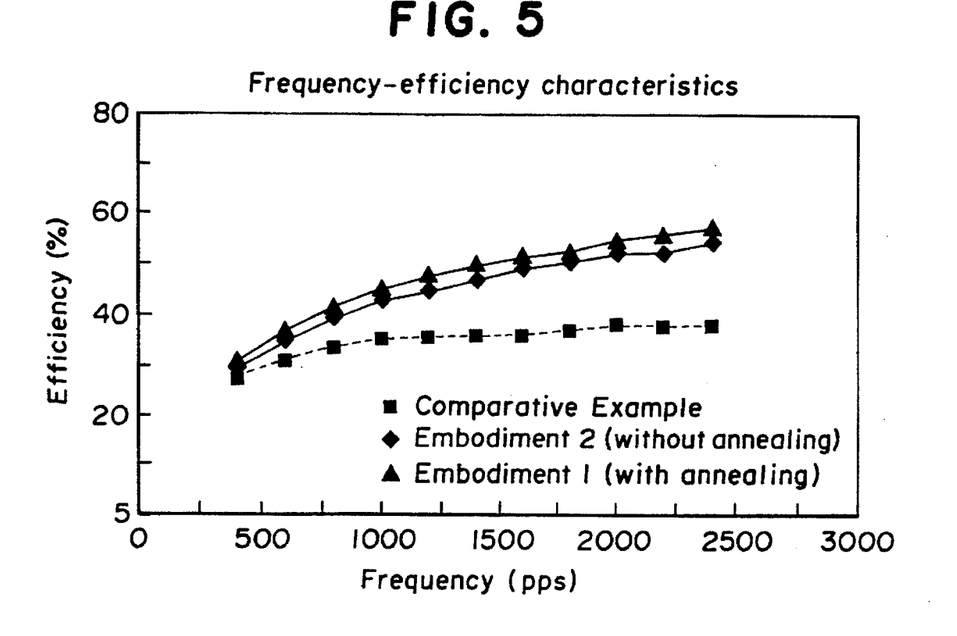
FIG. 5 is a characteristic diagram showing the effect of the first embodiment of the present invention.

In conjunction with efficiency with respect to the frequency at this time, the product of the present invention exhibited the improvement of about 3 to about 20% in comparison with the prior art product (Comparative Example) as shown in FIG. 5.

Next, as to the effects of annealing of the Fe-Cr type alloy used as the material of the stator yoke in Embodiment 1 of the present invention, the comparison of the annealing effects was conducted with SUY and SPC that had for long been used as the stator yoke materials.

More concretely, the change of the A.C. magnetic characteristics, that is, the change of the magnetic flux, due to annealing, was examined. Because this experiment dealt with the characteristics of the material itself, each of the materials was worked into the flat ring plate, that is, into the same shape (inner diameter 15ϕ, outer diameter 25ϕ, thickness 1 mm) as the flange portion of the stator yoke, and was further bent and folded at the center by press working so as to form an angle of 90 degrees. This working provided approximately the stress (residual stress) that occurred when the comb tooth-like magnetic pole portion was formed.

Next, the A.C. magnetic characteristics of the ring plate so bent were measured by a B-H analyzer at a field intensity of 800 A/m and a frequency of 500 Hz. As a result, it has been confirmed that though the magnetic flux intensity increased with annealing as shown in the later-appearing Table 1, the extend of this increase was about 33% for both SUY and SPC used generally in the past and similarly it was about 30% in the present invention. In other words, more remarkable effects could be observed in the product of the present invention.

TABLE 1

| Yoke material & flux density (T) | | | |
|---|---|---|---|
|  | SPC | SUY | Fe—Cr steel sheet |
| without annealing | 0.45 | 0.6 | 0.8 |
| with annealing | 0.6 | 0.8 | 1.05 |

Figure 6:
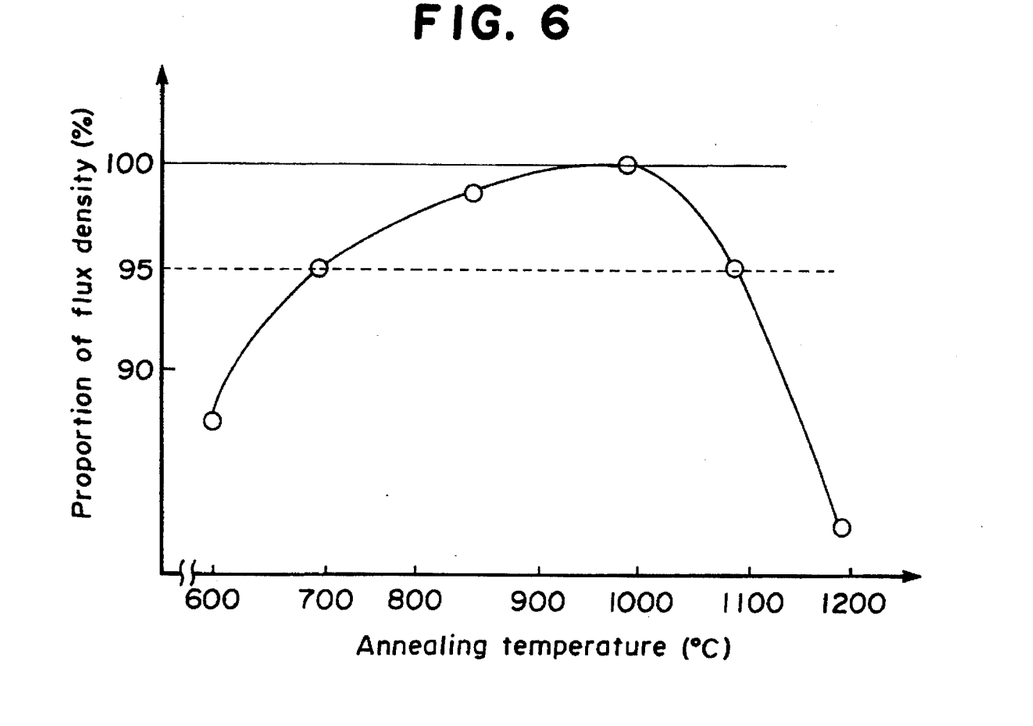
FIG. 6 is a characteristic diagram showing the effect of the first embodiment of the present invention.

In order to determine the most suitable temperature condition for annealing, the flux density was measured using the annealing temperature as the parameter. In this experiment, too, the Fe-Cr type alloy ring plate was bent and folded in the same way as described above so as to generate simulatively the residual stress by press working. FIG. 6 shows the proportion of the flux density at each temperature by setting the maximum value (maximum flux density) to 100%.

As shown In FIG. 6, the maximum flux density (1.1 T) was attained at 1,000° C., and the flux density exhibited the tendency of drop with an increasing or decreasing temperature. This is because when the temperature dropped, the effect of annealing did not appear (that is, distortion could not be removed sufficiently). When the temperature rose, on the other hand, martensite was precipitated, though the residual stress could be removed, and the magnetic characteristics were deteriorated in consequence.

As a result, the range in which the remarkable effects of annealing could be obtained was the temperature range (700° to 1,100° C.) which corresponded to 95% of the maximum flux density. This range is at least 1.25 times the range of the characteristics (flux density) obtained by annealing SUY as the prior art material.

When annealing Is carried out after press working as in this embodiment, deterioration of the magnetic characteristics resulting from the residual stress generated by press working can be recovered (can be improved). When a stepping motor is assembled by the use of such stator yokes, a stepping motor having a high output can be accomplished. Particularly remarkable effects can be obtained when the annealing temperature is within the range of 700° to 1,100° C.

Next, the production method of the stator yoke according to the second embodiment of the present invention will be explained. The second embodiment relates to the production method of stator yokes having high performance and high reliability for an extended period on the basis of the production method of the first embodiment.

In other words, the first embodiment forms the comb tooth-like magnetic pole portions by press working and then carries out annealing to obtain the stator yoke having a high flux density and hence, the stepping motor having high efficiency. However, because the Fe-Cr type alloy is exposed to a high temperature during the annealing processing, the problems occur that the surface composition changes and the rust-proofing effect under the environment of practical use drops at normal temperature.

Figure 7:
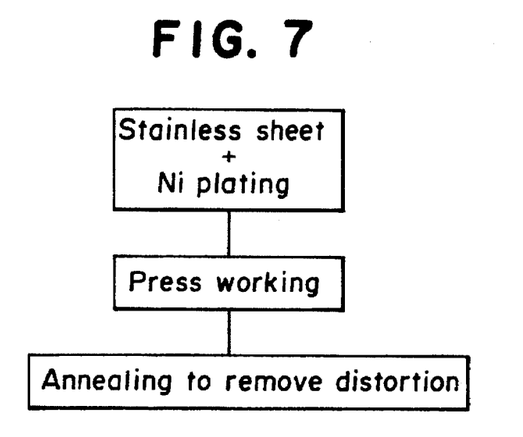
FIG. 7 is a process diagram showing the second embodiment of the production method of a stator yoke according to the present invention.

In this embodiment, therefore, nickel plating is applied to the surface of the Fe-Cr type alloy used in the first embodiment as the constituent material of the stator yoke in order to solve such a problem, and the nickel plated sheet material is then press-worked into the predetermined shape in the same way as in the first embodiment. Next, the annealing processing is carried out so as to recover deterioration of the magnetic characteristics occurring at the time of press machining (see FIG. 7).

In other words, nickel plating is thermally stable at the annealing temperature (not higher than 1,100° C. at the highest) and the change of the surface composition does not occur. Accordingly, because nickel plating exists on the surface of the stator yokes which are brought into contact with air under the environment of practical use, the rust-proofing effect can be exhibited. The magnetic characteristics can be improved by the annealing treatment of the Fe-Cr type alloy. For this reason, rust does not develop even after the product is used for a long time, and the stepping motor having high reliability and high performance (high efficiency) for a long time can be constituted.

In order to confirm the effect of this embodiment, ten stator yokes were produced by applying nickel electroplating having a thickness of 3 μm to the surface of the Fe-Cr type alloy sheet material, then press working the sheet material into a predetermined shape and annealing it at 850° C. (for not longer than 1 hour) in the nitrogen atmosphere. As Comparative Example, ten stator yokes were produced by the same method and under the same condition except that nickel plating was not applied.

A high temperature high humidity acceleration environment test was conducted on each of the stator yokes (twenty in total) so produced to check the occurrence of rust. According to this test method, each sample was left standing at 40° C. and 95% humidity for 240 hours:

The occurrence of rust was not observed in the ten stator yokes which were nickel plated, but the occurrence of rust spots was observed in the Fe-Cr type alloy (without nickel plating) stator yokes.

Figure 8:
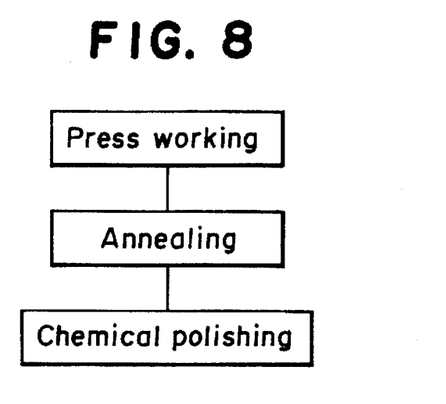
FIG. 8 is a process diagram showing the third embodiment of the production method of the stator yoke according to the present invention.

As the timing of nickel plating, plating treatment was carried out to the Fe-Cr type alloy sheet material (before press working) in this embodiment, but the present invention Is not limited to this timing. For example, it is possible to apply nickel plating to the surface of the Fe-Cr type alloy after its press working and then to carry out annealing treatment. Plating treatment is easier in the former case but in the latter case, plating can be reliably applied to the entire surface of the stator yoke. (For, non-formation portions occur on the side surface in the direction of the thickness in the former case.) FIG. 8 shows a third embodiment of the present invention. In the same way as in the second embodiment described above, this embodiment, too, produces a stator yoke which improves the drops of the rust-proofing effect and the corrosion resistance resulting from annealing and which has stable and high characteristics for a long time, and eventually, a stator yoke for constituting a stepping motor.

More concretely, a predetermined sheet material made of the Fe-Cr type alloy was press working into a predetermined shape and was then annealed in the same way as in the first embodiment in order to improve the magnetic characteristics.

In this embodiment, chemical polishing is applied to the stator yoke which is subjected to annealing. In this way, the surface layer the properties of which change due to annealing can be removed, and as the stator yoke is thereafter left standing in air, a passivation film is formed on the surface. Consequently, a potential difference on the yoke surface becomes small and corrosion resistance can be improved, so that the rust-proofing effect can be recovered. Chemical polishing is carried out by using one of various kinds of acids or a mixture of at least two kinds of acids, at normal temperature or by heating.

More concrete examples of the acids used include hydrofluoric acid, hydrochloric acid, nitric acid, sulfuric acid, and so forth. Examples of their combinations are (1) nitric acid+hydrochloric acid, (2) nitric acid+hydrochloric acid, (3) nitric acid+ammonium fluoride, (4) hydrochloric acid+ hydrogen peroxide, (5) nitric acid, (6) hydrochloric acid, and so forth.

Preferred among then are the combination (1) and (3) because of such advantageous features that treatment can be conducted at normal temperature and within a short time and the surface condition after treatment is good. When the hydrochloric acid type is used, desalting must be conducted completely after treatment (polishing), because it causes new rust, and sulfuric acid requires a long treatment time. Commercially available chemical polishing agents ("Nepros", etc.) may be used as well.

Next, in order to confirm the effect of this embodiment, the stator yoke of this embodiment was produced by press-working the Fe-Cr type alloy (12Cr) sheet material into a predetermined shape, annealing it at 850° C. for 1 hour (in the same atmosphere as that of each of the foregoing embodiments) and thereafter carrying out the chemical polishing treatment. A mixed acid of 10% $HNO_3$ and 0.3% HF was used for the chemical polishing treatment and this treatment was conducted at normal temperature for 2 minutes. As Comparative Examples, a stator yoke (Comparative Example 1) was produced by the same treatment as that of the production process described above with the exception that the chemical polishing treatment was not carried out, and a stator yoke (Comparative Example 2) was also produced by press-working SPC as the conventional material.

As the corrosion resistance test, the above three stator yokes were immersed in a mixed solution (40° C.) of 4% NaCl and 3% $H_2O_2$ and were left standing for eight hours, respectively, and the degree of erosion was evaluated.

According to the test result, whereas the degree of erosion of the stator yoke of this embodiment (with chemical polishing) was 3.4, it was 7.7 for Comparative Example 1 and was 21.0 for Comparative Example 2. It was thus confirmed that the corrosion resistance could be remarkably improved by the method of this embodiment.

The same test as the test of the second embodiment was carried out for the three kinds of the stator yokes described above. As a result, it was confirmed that the rust did not occur in the stator yoke of this embodiment but rust spots were observed in the stator yokes of Comparative Examples. Accordingly, it could be confirmed that the rust-proofing effect could be recovered sufficiently in this embodiment.

Figure 9:
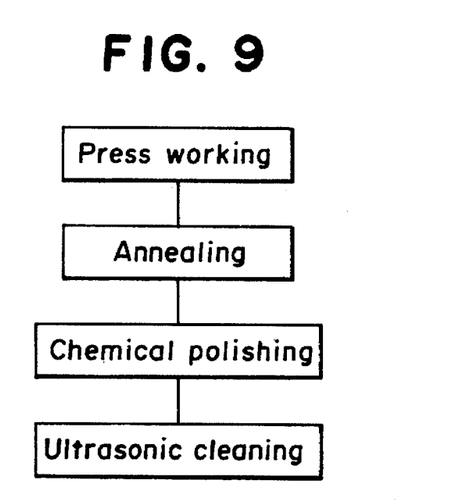
FIG. 9 is a process diagram showing the fourth embodiment of the production method of the stator yoke according to the present invention.

FIG. 9 shows the fourth embodiment. This embodiment, too, is directed to improve the magnetic characteristics by annealing as well as the corrosion-resistance, etc.

As shown in the drawing, the production method of this embodiment is based fundamentally on the third embodiment. In other words, the procedures of up to press-working the predetermined Fe-Cr type alloy sheet material into a predetermined shape, then conducting annealing and thereafter removing the surface layer the properties of which changed by chemical polishing were the same as those of the third embodiment described above.

Therefore, this embodiment is characterized in that ultrasonic cleaning is carried out after chemical polishing described above. Because ultrasonic cleaning is applied in this way, a physical force can be applied to the surface layer the properties of which changed, so that this surface layer having the changed properties by annealing can be removed more reliably. In other words, the surface layer the properties of which changed can be removed by chemical polishing as is made in the third embodiment, but It cannot be removed completely within a short time but tends to remain. To completely remove this surface layer, the treatment time must be extended, for example. However, even if any film portions which cannot be removed but remain exist, the bonding power with the Fe-Cr type alloy base becomes weak. Therefore, when ultrasonic working is made after chemical polishing as in this embodiment, the surface layer the properties of which have changed and the bonding power of which has become weak can be removed easily and reliably. As a result, the passivation film which is thereafter formed becomes complete and the corrosion resistance can be improved much more.

Next, to confirm the effect of this embodiment, a stator yoke (Comparative Example: corresponding to the third embodiment) was produced by press-working the Fe-Cr type alloy (12Cr) sheet material into a predetermined shape, then carrying out annealing at 850° C. for 1 hour (in the same atmosphere as that of each of the foregoing embodiments) and thereafter conducting the chemical polishing treatment (using a mixed acid of 10% $HNO_3$ and 0.3% HF at normal temperature for 2 minutes), and a stator yoke (this embodiment was produced by applying ultrasonic cleaning after such chemical polishing, and the corrosion resistance was evaluated for each of the stator yokes. Evaluation of the corrosion resistance was made by measuring the degree of corrosion of the stator yokes when the test was carried out in the same way as in the third embodiment described above. It was thus confirmed that whereas the degree of erosion of the stator yoke of Comparative Example was 3.4 as described above, it was 1.03 for the stator yoke of this embodiment, and this stator yoke had extremely high corrosion resistance. Further, when the high temperature high moisture test was carried out in this embodiment, too, in the same way as in the third embodiment, rust did not occur.

In the embodiment and the experiment described above, ultrasonic cleaning was carried out after chemical polishing. However, the present invention is not particularly limited thereto. For example, it is also possible to carry out simultaneously ultrasonic cleaning during the chemical polishing treatment.

Figure 10:
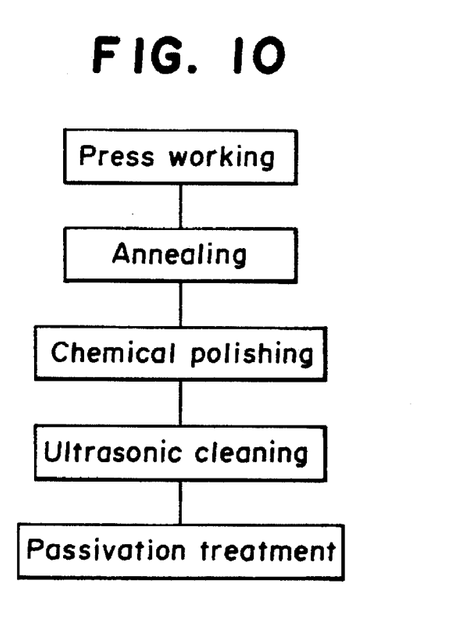
FIG. 10 is a process diagram showing the fifth embodiment of the production method of the stator yoke according to the present invention.

FIG. 10 shows the fifth embodiment of the present invention. In the same way as in the second to fourth embodiments, this embodiment, too, is directed to improve the corrosion resistance, etc., while Improving the magnetic characteristics by annealing, and to further improve the corrosion resistance in comparison with the third and fourth embodiments.

As shown in the drawing, the production method of this embodiment is fundamentally based on the fourth embodiment. In other words, the steps of press-working the predetermined Fe-Cr type alloy sheet material into the predetermined shape, then annealing the sheet, thereafter carrying out chemical polishing to remove the surface layer the properties of which have changed and thereafter removing reliably tile surface layer the properties of which have changed by applying ultrasonic cleaning, were the same as those of the fourth embodiment.

In this embodiment, the passivation treatment is carried out after ultrasonic cleaning so as to compulsively form the passivation film. This passivation treatment is carried out by using a predetermined oxidizing agent such as nitric acid alone or a mixed solution of nitric acid and chromic acid and immersing the stator yoke in such a treating solution.

In other words, in the third and fourth embodiments described above, after chemical polishing of the stator yoke or after ultrasonic cleaning after chemical polishing, the stator yoke is exposed to air so as to naturally form the passivation film on the surface of the stator yoke. However, Fe constituting the Fe-Cr type alloy is likely to be oxidized and the rust (rust spots) are likely to develop before the passivation film is completely formed. Even when Fe is not oxidized, a long time is necessary before the passivation film is formed.

Therefore, the passivation film is compulsively formed within a short time by carrying out the passivation treatment. In other words, when oxidation is compulsively made using the oxidizing agent described above, the passivation film is compulsively formed. Therefore, the passivation film so formed is stronger than the passivation film formed by leaving the film standing in air, and the corrosion resistance can be further improved.

Next, to confirm the effect of this embodiment, the stator yoke of this embodiment was produced by press-working the Fe-Cr type alloy (12Cr) sheet material into a predetermined shape, then annealing it at 850° C. for 1 hour in the same atmosphere as that of each of the foregoing embodiments, thereafter carrying out the chemical polishing treatment using a mixed acid of 10% $HNO_3$ and 0.3% HF at normal temperature for 2 hours and further conducting ultrasonic cleaning. Thereafter, the passivation treatment was carried out by 20% $HNO_3$ at 60° C. for 30 minutes.

In the same way as in each of the foregoing embodiments, the resulting stator yoke was immersed in a mixed solution (40° C.) of 4% NaCl and 3% $H_2O_2$ and was left standing for 8 hours so as to determine the degree of erosion. As a result, it was 0.92. It was thus confirmed that this stator yoke had the highest corrosion resistance among the stator yokes produced by the foregoing embodiments and the stator yokes made of SPC. When the acceleration environment test (40° C., 95% RH, 240 hours) as to the rust-proofing effect was carried out, the occurrence of the rust was not observed.

On the other hand, in each of the foregoing embodiments, predetermined treatments were carried out after press working was conducted. To execute such press working, it is carried out while a press oil is applied to the sheet material. In the case of the Fe-Cr alloy, a blend of an extreme-pressure additive of a primarily chlorine type has been used in the past. In the case of this chlorine type press oil, however, the press oil is one of the major causes for the occurrence of the rust, and the rust occurs depending on the preservation state after press working.

Particularly when the interval from pressing till annealing is long, the rust is likely to develop In the interim. Accordingly, to suppress the occurrence of such rust, cleaning must be made sufficiently after pressing and this operation is troublesome. If the press oil cannot be removed sufficiently, adverse influences are exerted on the atmosphere of the annealing and on the solution for the chemical polishing/passivation treatment in addition to the problem of occurrence of the rust.

Therefore, this embodiment uses a non-chlorine type press oil for such press working, and even when the press oil remains after washing, the rust does not occur.

After press working is carried out by using the non-chlorine type press oil as described above, the predetermined treatments of the first to fifth embodiments are conducted and the stator yoke having the desired characteristics are produced. In this way, the effect specific to the treatment of each embodiment is exhibited more effectively. Examples of the non-chlorine type press oil are sulfur type and phosphorus type press oils.

To evidence this embodiment, ten each stator yokes were produced by press working by using the chlorine type press oil and the non-chlorine type press oil, respectively, and the high temperature high humidity test (acceleration test) described above was carried out. As a result, it was found out that the occurrence of rust was not at all observed in the case of the non-chlorine type press oil, but the occurrence of rust spots was observed when the chlorine type press oil was used.

Figure 11A:
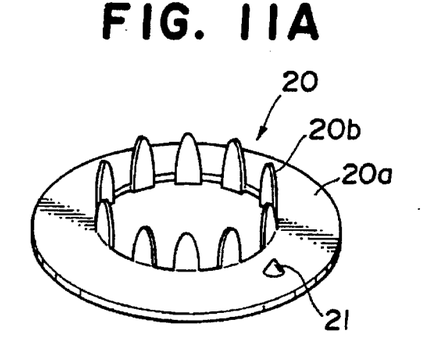
FIG. 11A is perspective view showing the first embodiment of the stator yoke according to the present invention.
Figure 11B:
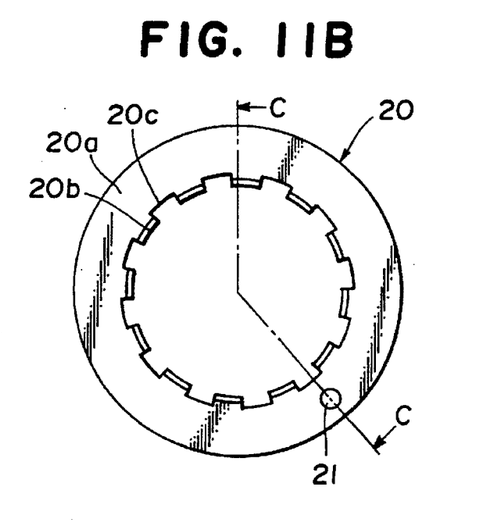
FIG. 11B is its front view.
Figure 11C:
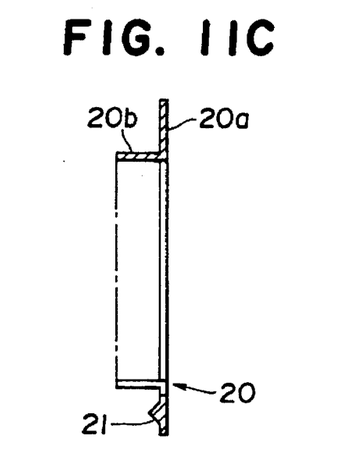
FIG. 11C is a sectional view taken along a line C—C indicated by an arrow.

FIG. 11A, 11B and 11C show the stator yoke according to the first embodiment of the present Invention. As shown in the drawing, the stator yoke 20 (comprising any of the stator yokes 5 to 8 shown in FIG. 1) has a structure wherein comb tooth-like magnetic pole portions 20b are formed by bending by 90° C. on the inner periphery of the ring-like flange portion 20a of the flat sheet by press working. In the present invention, a protuberance 21 having a predetermined shape is formed on the surface of the flange portion 20a on the side that the comb tooth-like magnetic pole portions 20b are erected. As is obvious from FIG. 11C, the protuberance 21 has a conical shape whose distal end is tapered. The height of the protuberance is set to be not greater than 1.0 mm but is naturally greater than 0 because it is a protuberance. This protuberance 21 can be formed by press-working simultaneously with the comb tooth-like magnetic pole portions 20b.

The reason why the protuberance 21 is formed as described above is as follows. In the third to fifth embodiments, the chemical polishing treatment is carried out after annealing, and the stator yoke formed by press working is immersed in the predetermined treating solution. To press work the sheet material, a predetermined press oil is applied to the sheet material as in the sixth embodiment. To remove the press oil so applied after working, cleaning is conducted by immersing the work into the washing solution. To conduct such a treatment, large quantities of stator yokes must be processed simultaneously on a practical production line.

Figure 12A:
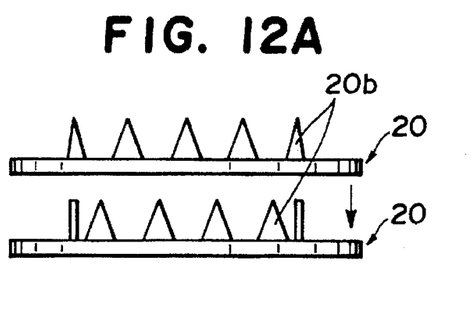
FIGS. 12A and 12B is an explanatory view showing the problems.
Figure 12B:
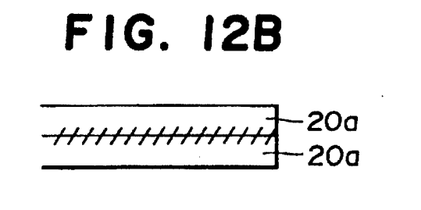

Then, the comb tooth-like magnetic pole portions 20b of the two stator yokes 20 face in the same direction as shown in FIGS. 12A and 12B, and when the angle of these stator yokes 20 is deviated by ½ pitch of the comb tooth-like magnetic pole portions 20b, recesses 20c are formed between the adjacent comb tooth-like magnetic portions 20b as shown in FIG. 11B. Accordingly, the comb tooth-like magnetic portions 20b of the lower stator yoke fit into the recesses 20c of the upper stator yoke. When only the flange portion 20a is considered, both flange portions 20a come Into mutual surface contact as shown in FIG. 12B, and the treating solutions described above (chemical polishing solution, cleaning solution, etc.) cannot enter this contact surface. As a result, the surface of the flange portions 20a under this surface contact state cannot be sufficiently and chemically polished and the rust is likely to develop from this portion. When the press oil is not sufficiently cleaned, treatment such as annealing is carried out while this press oil remains, and the press oil is likely to mix with the atmosphere at the time the annealing treatment or with the treating solution for chemical polishing and exerts adverse influences. Further, when the chlorine type press oil is employed, the generation of the rust is promoted in addition to the problem described above and in any case, deterioration of the characteristics is induced.

Figure 13A:
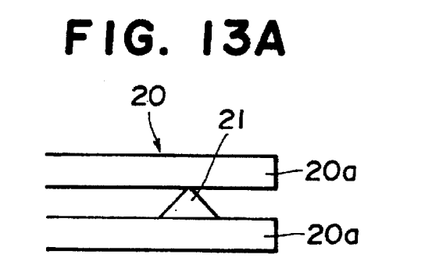
FIG. 13A is an explanatory view useful for explaining the operation of the stator yoke shown in FIGS. 11A, 11B and 11C

Therefore, when the conical protuberance 21 is disposed as in this embodiment, the distal end of the protuberance 21 formed on the lower frame yoke 20 comes into contact with the lower surface of the flange 20a of the upper frame yoke 20 as shown in FIG. 13A even when the frame yokes 20 overlap each other with the positional relationship shown in FIG. 12A, and their further approach is inhibited. In other words, a gap corresponding to the height of the protuberance 21 occurs between both flanges, and the treating solution for chemical polishing and the cleaning solution can enter through this gap. Accordingly, predetermined treatments can be reliably applied to the surface of the flanges 20a and the stator yokes having desired high characteristics (high efficiency and free from the occurrence of rust) can be produced without causing the problems described above.

Figure 13B:
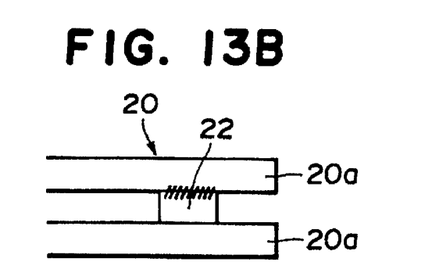
FIG. 13B is an explanatory view useful for explaining the operation of a Comparative Example.

The reason why the protuberance has the conical shape with the pointed distal end is as follows. If the protuberance is a circular cylinder (with the distal end having a flat surface) as shown in FIG. 13B, the flange portion 20a comes into surface contact with another at the distal end surface of its protuberance, and the same problem as described above occurs at this contact portion. If the rust occurs at this contact portion, it expands to the surrounding portion. For this reason, this problem cannot be neglected even though the contact area is small. Accordingly, this embodiment solves the problem by attaining the point contact by the pointed distal end.

Figure 14:
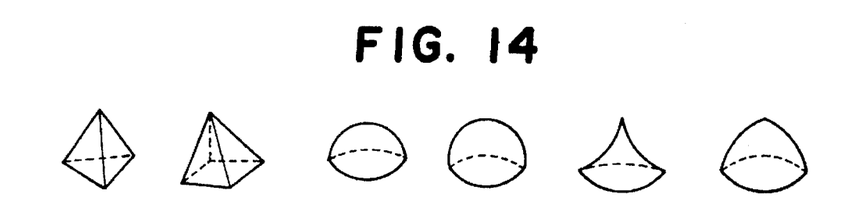
FIG. 14 shows a modified example of the protuberance formed on the stator yoke.

For the reason described above, the shape of the protuberance is not particularly limited to the conical shape but various other shapes can be employed so long as their distal end is pointed. Since the point contact which reduces the contact area as much as possible should be established, the shapes the distal end of which is rounded into a curved surface shape may be used, as well. An example is shown in FIG. 14 and shapes other than the shape shown in the drawing may of course be used.

In this embodiment, the height of the protuberance 21 is not greater than 1.0 mm. For, if it exceeds 1.0 mm, the height becomes greater than the sheet thickness of the flange portion of ordinary coils to be combined with the stator yokes during assembly of final stepping motors, and if this height is used as such, the coil is likely to be damaged. To solve this problem, the sheet thickness must be increased. Then, the thickness of the motor itself increases, and it becomes difficult to reduce the size and the thickness of the motor. Further, another problem occurs that when the coil volume decreases, motor performance drops.

If any height of the protuberance is secured, a greater effect can be obtained than when the protuberance does not exist. However, when the height of the protuberance is small, it becomes difficult for the press oil which originally adheres to the surface of the flange portion 20a, to flow outside due to the surface tension, etc., in the case of washing of the press oil because the gap is small, and it becomes difficult for the cleaning solution and the chemical polishing solution to enter, on the contrary. Therefore, when the height of at least 0.3 mm is secured, such problems can be avoided, and the height is preferably at least 0.3 mm.

In order to verify the effect of the embodiment described above, the following experiment was carried out. 100 samples were produced for each of the types, that is, the type wherein the conical protuberance was formed on the stator yoke as In this embodiment, the type wherein the protuberance was not formed as Comparative Example 1, and the type wherein a round circular protuberance was formed as shown in FIG. 13B as Comparative Example 2. Next, 100 samples of each type were altogether cleaned and were then subjected to the chemical polishing treatment so as to evaluate the surface condition after each treatment. When the high temperature high moisture test (acceleration test) was conducted for each of the samples after chemical polishing, the result shown in Table 2 could be obtained. Incidentally, the occurrence of the rust was evaluated in accordance with the following ranks:

A: rust spot

B: part of the rust changed to a mass

C: rust occurred in a broad range (A<B<C)

It was confirmed from the result given above that the explanation given above was correct.

FIGS. 15A, 15B, 16A and 16B show the second embodiment of the stator yoke according to the present invention.

Figures 15A, 15B, 16A, 16B:
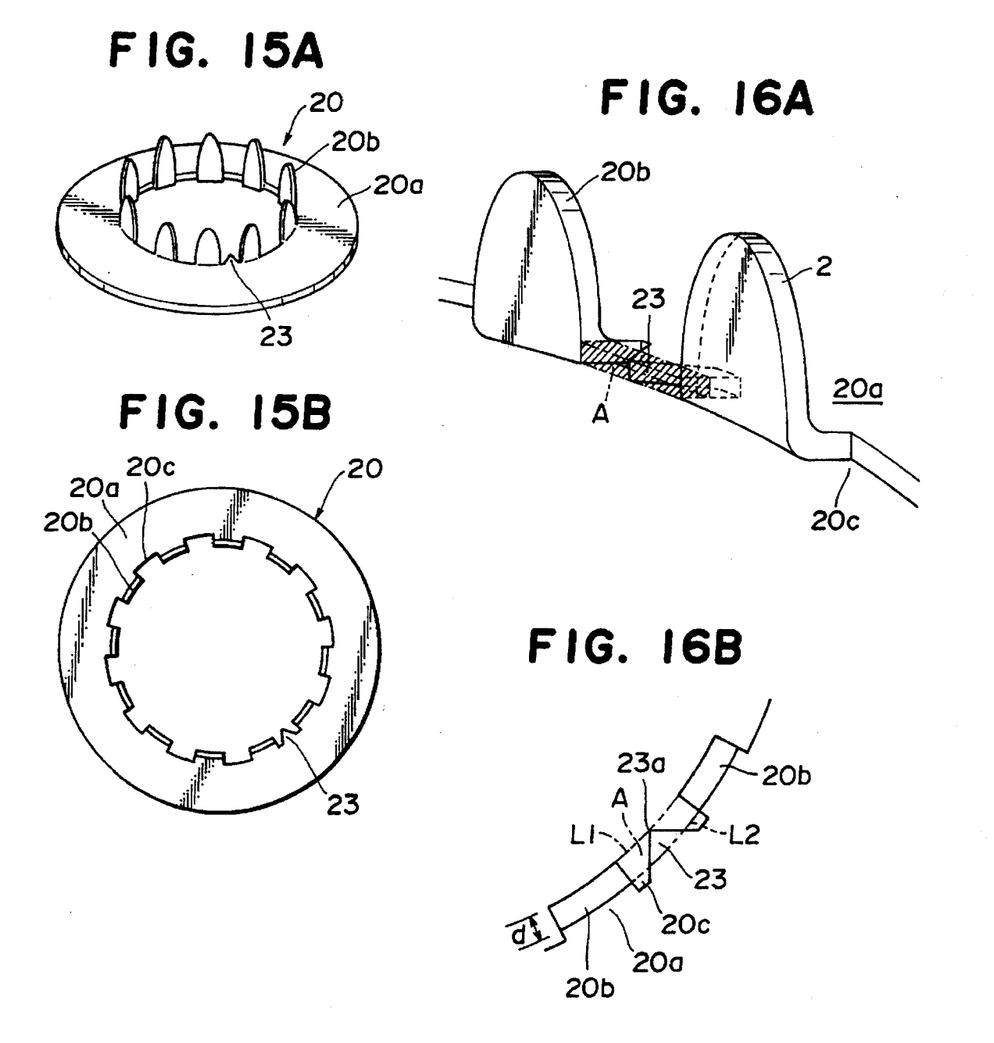
FIG. 15A is a perspective view showing the second embodiment of the stator yoke according to the present invention.
FIG. 15B is its plan view.

As shown in the drawings, unlike the first embodiment, a protuberance 23 is formed in such a manner as to extend from the inner peripheral surface of the recess 20c formed between the comb tooth-like magnetic pole portions 20b towards the center of the flange portion 20a.

As shown in the enlarged views of FIGS. 16A and 16B, at least the distal end 23a of this protuberance 23 is positioned on the circumference of which the comb tooth-like magnetic pole portions 20b are disposed. More specifically, because the comb tooth-like magnetic pole portion 20b has a predetermined thickness "d", the protuberance 23 must be positioned within a range "A" between a line L1 on the inner circumferential side and a line L2 on the outer circumferential side. In other words, since the distal ends of the comb tooth-like magnetic pole portions 20b of other stator yokes 20 are restricted to further approach the protuberance 23 after coming into contact with it, the protuberance 23 does not come into contact with the comb tooth-like magnetic pole portion when it is out of the range of L2 (outside). When it is out of the range of L1 (closer to the center), the protuberance comes into (or is likely to come into) contact with the rotor surface when the motor is assembled.

Figure 17:
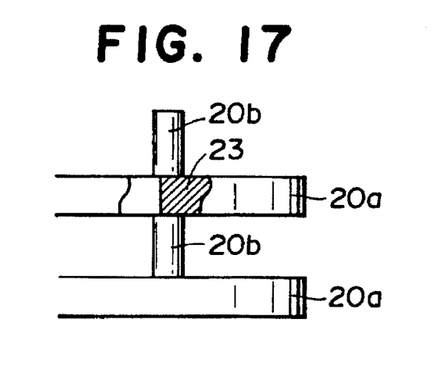
FIG. 17 is an explanatory view useful for explaining the operation of the stator yoke shown in FIGS. 15A and 15B.

Even when the stator yokes overlap each other in this embodiment as shown in FIG. 12A in the same way as in the first embodiment, the comb tooth-like magnetic pole portions 20b of the lower stator yoke come into contact with the protuberance 23 of the upper stator yoke, and both flange portions 20a and 20a do not come closer to each other beyond the height of the comb tooth-like magnetic pole portions as shown in FIG. 17. Accordingly, predetermined treatment such as cleaning and chemical polishing can be reliably carried out. When the experiment was carried out in the same way as in the first embodiment by producing 100 samples of this embodiment, there was no occurrence of rust in the samples did not exist.

Further, since the protuberance 23 exists on the same plane as the flange portion 23, influences on the coil bobbin does not exist unlike the first embodiment. Therefore, the operation efficiency of the subsequent assembly becomes high. Since the protuberance can be formed by a mere cutting (shearing) operation, it can be shaped easily. Further, the shape of the protuberance is not necessarily limited to the triangle shown in the drawing and arbitrary shapes can be employed.

Figure 18:
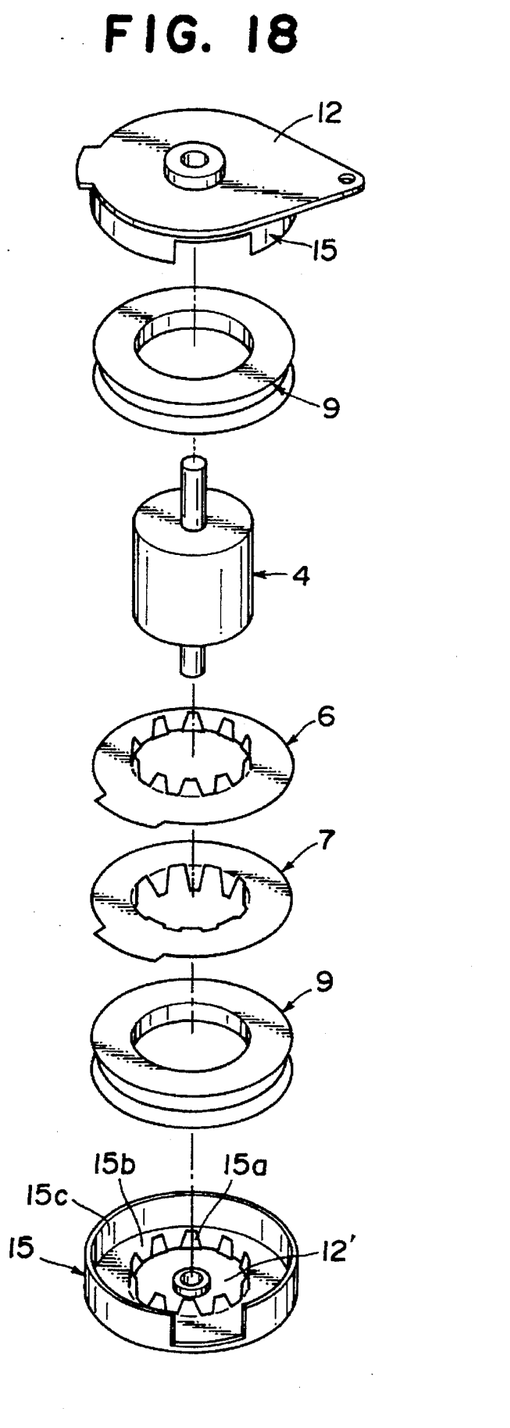
FIG. 18 is an exploded perspective view showing another example of the stepping motor to which the stator yoke produced according to the present invention is applied.

The stepping motor of FIG. 1 having a predetermined construction can be produced by using the stator yoke produced in each of the forgoing embodiment in suitable combination with other components. Needless to say, the construction of the stepping motor to which the stator yoke (made of the Fe-Cr type alloy) is applied need not necessarily limited to the one shown in the drawings. In the case of the example shown in the drawing, the stepping motor is constituted by using all the four stator yokes produced in accordance with the present invention, but even if the present stator yoke(s) of the invention is used only partly, the improvement of the characteristics can be recognized to the corresponding extent. Further, it is possible to apply the stator yoke to stepping motor having the construction wherein a frame yoke is divided in the axial direction for each phase as shown in FIG. 18.

In other words, an open portion is formed in the cup yoke 15 by drawing and a second stator yoke 6 (a third stator yoke 7) is fitted to the open portion. The excitation coil 9 is fitted into the space defined between both yokes. The upper and lower cup yokes 15, 15 are butted to each other at a predetermined angle position and are integrated by welding.

Since the center portion of the bottom of the cup yoke 15 is open, this opening is closed by fitting the flanges 12, 12'. The rotor 4 is rotatably supported by a bearing formed by both flanges 12, 12'.

In other words, in this cup yoke 15, the comb tooth-like magnetic pole portions 15a are so formed as to erect around the inner peripheral edge of the ring-like flange 15b as shown in the drawing, and a cylindrical side wall, that is, the frame yoke portion 15c, is formed round the outer peripheral edge of the flange 15b. In other words, in this embodiment, the stator yoke and the frame yoke are produced by the same component (cup yoke 15). This means that the present invention produces the stator yoke to which the function of the frame yoke is added, as in this embodiment.

As described above, the production method of the stator yoke according to the present invention can improve the magnetic characteristics, particularly the A.C. magnetic characteristics Important under the practical environment of use, when the stator yoke is produced by using the Fe-Cr type alloy. Moreover, because annealing is carried out after press working, the magnetic characteristics that have cropped due to the residual stress during press working can be recovered, and can be further improved. The effect of annealing becomes higher when the annealing temperature is from 700° to 1,100° C.

The chemical polishing treatment is carried out after such annealing and then ultrasonic cleaning is conducted. Furthermore, passivation treatment is carried out. When these procedures are employed, the surface layer the properties of which have changed due to annealing can be removed and the passivation film can be formed either naturally or compulsively. Accordingly, the rust-proofing effect as well as corrosion resistance can be improved. Such effects become higher in the latter case.

When nickel plating is applied to the surface of the Fe-Cr type alloy separately from the series of treatments described above, nickel plating exist on the stator yoke because nickel plating is thermally stable at the annealing temperature, so that the improvement of the magnetic characteristics due to annealing can be improved while maintaining the rust-proofing effect.

Further, when the non-chlorine type press oil is used when press working is conducted, the rust does not occur on the stator yoke during storing after pressing.

On the other hand, when the protuberance is disposed on the surface of the flange portion of the stator yoke or on its Inner peripheral surface in the stator yoke of the present invention, it can prevent the following problem. Namely, when large quantities of stator yokes are simultaneously processed, a plurality of stator yokes overlap one another. However, one of the stator yokes butts against the protuberance of other stator yokes and the distal end of one of the comb tooth-like magnetic pole portions butts against the protuberances of the other stator yokes, so that they cannot further approach one another, that is, cannot overlap one another and a space is formed between the flange portions. Accordingly, since the predetermined treating solution can spread over the entire surface, the treating effect becomes more reliable.

TABLE 2

| shape of stator yoke | condition after cleaning (oil remaining condition) | condition after chemical treatment | |
|---|---|---|---|
| | | condition remaining after treatment | high temperature high humidity test (occurrence of rust) |
| (with protuberance) present product | Though distal end of protuberance comes into contact, no oil remains because cleaning can be reliably made (number of overlappings . . . 20 sets) | surface layer subjected to property change can be reliably scraped off | (nil) |
| (without protuberance) Comparative Example 1 | press oil adheres to overlap portion, and due to this oil, yokes cannot be separated from one another (number of overlappings . . . 30 sets) | Because treatment of overlap portion is hindered, surface layer subjected to property change remains. | (occurrence of rust) rank C |
| (with round cylindrical protuberance) Comparative Example 2 | oil adheres to portion with which distal end of protuberance is in contact (number of overlappings . . . 20 sets) | surface layer subjected to property change remains at portion with which distal end of protuberance comes into contact. Treatment of surrounding portion of pole teeth is not reliable, either. | (occurrence of rust) rank A |

We claim:

1. A stator yoke for a stepping motor wherein said stepping motor has a rotor portion having a multi-polarized permanent magnet, a stator yoke portion having a plurality of comb tooth-like pole portion, an excited coil means provided around said comb tooth-like pole portion of said stator yoke portion, and a frame yoke encasing therein said stator yoke portion and said excited coil means, wherein at least a part of said stator yoke is made of a ferrite type Fe-Cr type alloy.

2. A stator yoke according to claim 1, wherein the ferrite type Fe-Cr alloy contains 10 to 20 wt % of Cr and 80 to 90 wt % of Fe.

3. A method of producing a stator yoke for a stepping motor comprising the steps of preparing a sheet material made of a ferrite type Fe-Cr type alloy having a predetermined shape, press-working said sheet material to bend at least an inner peripheral edge of a flat ring-like flange portion in a predetermined direction and to form a plurality of comb tooth-like pole portions, and annealing said comb tooth-like pole portions.

4. A production method of a stator yoke for a stepping motor according to claim 3, wherein the temperature of said annealing is within the range of 700° to 1,100° C.

5. A production method of a stator yoke in a stepping motor according to claim 3, wherein nickel plating is applied to the surface of said sheet material made of said Fe-Cr type alloy before or after said press working, and said annealing is carried out at a predetermined step after said nickel plating.

6. A production method of a stator yoke in a stepping motor according to claim 3, wherein chemical polishing is carried out after said annealing so as to conduct surface treatment of said stator yoke.

7. A production method of a stator yoke in a stepping motor according to claim 6, wherein ultrasonic cleaning is carried out after or during said chemical polishing treatment.

8. A production method of a stator yoke in a stepping motor according to claim 7, wherein passivation treatment is carried out by immersing said stator yoke in a predetermined acid after said ultrasonic cleaning.

9. A production method of a stator yoke in a stepping motor according to claims 3, wherein, said press-working is carried out by using a non-chlorine type press oil.

10. A stator yoke made of a ferrite type Fe-Cr type alloy comprising a flat ring-like flange portion, a plurality of comb tooth-like pole portions formed by bending an inner peripheral edge of said flange portion in a predetermined direction, and a protuberance having a tapered distal end formed at a predetermined position on the surface of said flange portion.

11. A stator yoke according to claim 10, wherein the height of said protuberance is not greater than 1.0 mm.

12. A stator yoke made of a ferrite type Fe-Cr type alloy comprising a flat ring-like pole portions formed by bending an inner peripheral edge of said flange portion in a predetermined direction, and a protuberance projecting towards the center at a portion of the inner peripheral surface of said flange portion at which said comb tooth-like pole portions are not formed.

* * * * *